United States Patent
Kataoka et al.

(10) Patent No.: US 8,299,145 B2
(45) Date of Patent: Oct. 30, 2012

(54) METHOD OF PRODUCING A VINYL CHLORIDE RESIN FORMED ARTICLE

(75) Inventors: Makoto Kataoka, Shunan (JP); Yasuto Yasuzawa, Shunan (JP); Yuusuke Shimahara, Shunan (JP)

(73) Assignee: Tokuyama Corporation, Shunan-Shi (JP)

( * ) Notice: Subject to any disclaimer, the term of this patent is extended or adjusted under 35 U.S.C. 154(b) by 0 days.

(21) Appl. No.: 13/336,002

(22) Filed: Dec. 23, 2011

(65) Prior Publication Data

US 2012/0165433 A1 Jun. 28, 2012

(30) Foreign Application Priority Data

Dec. 27, 2010 (JP) .................. 2010-290843

(51) Int. Cl.
*C04B 28/14* (2006.01)
*C08K 3/30* (2006.01)
(52) U.S. Cl. .......................... 524/7; 524/421
(58) Field of Classification Search ............... 524/7, 421
See application file for complete search history.

(56) References Cited

U.S. PATENT DOCUMENTS

| | | | | |
|---|---|---|---|---|
| 4,048,337 A | * | 9/1977 | Fabbian | 514/770 |
| 2010/0190890 A1 | | 7/2010 | Michel et al. | |

FOREIGN PATENT DOCUMENTS

| | | | |
|---|---|---|---|
| JP | 50-95366 A | | 7/1975 |
| JP | 60-192745 | * | 2/1991 |
| JP | 7-118436 A | | 5/1995 |
| JP | 2010-533761 A | | 10/2010 |
| WO | WO 91/01349 | * | 2/1991 |

* cited by examiner

*Primary Examiner* — Ling Choi
*Assistant Examiner* — John Uselding
(74) *Attorney, Agent, or Firm* — Birch, Stewart, Kolasch & Birch, LLP (57) ABSTRACT

A method of producing a nonfoamed formed article of a vinyl chloride resin by mixing a hydrated water-containing gypsum powder and a vinyl chloride resin powder together, and heating the obtained mixture at a temperature lower than a temperature at which the vinyl chloride resin starts decomposing thereby to remove the hydrated water of the gypsum and to form the mixture. The method makes it possible to obtain a nonfoamed formed article free of defective appearance by directly adding the hydrated gypsum (specifically dihydrate gypsum) to the vinyl chloride resin without converting it to the anhydrous gypsum, without requiring wasteful energy cost, without causing foaming or defective forming stemming from the hydrated water and maintaining stability.

7 Claims, 1 Drawing Sheet

METHOD OF PRODUCING A VINYL CHLORIDE RESIN FORMED ARTICLE

This application claims priority to JP 2010-290843, which was filed Dec. 27, 2010.

TECHNICAL FIELD

This invention relates to a method of producing a non-foamed formed article of a vinyl chloride resin. More specifically, the invention relates to a method of producing a non-foamed formed article of a vinyl chloride resin blended with the gypsum as a filler.

BACKGROUND ART

Gypsum boards are composite materials obtained by lining both surfaces of gypsum core materials with a paper, are produced in an amount of about 4 million tons, and have now been widely used in a variety of fields. On the other hand, the gypsum boards that were once used and discarded (waste gypsum board) are now amounting to about one million tons annularly, and their amount is expected to further increase in the future.

Some of the waste gypsum boards have been recycled, as required, for separating papers therefrom and for recovering the gypsum for use again as the starting material for gypsum boards and for use as solidifying agents. However, the ratio of recovery is still low and most of them have been dumped on reclamation sites. From the standpoints of an increase in the amount of the waste gypsum boards in the future, limited final disposal sites in Japan and burden on the environment, therefore, a new use of the waste gypsum boards and a new recycling method thereof have been urged.

On the other hand, a vinyl chloride resin has a high degree of general applicability and can be blended with suitable amounts of inorganic fillers depending upon the use to attain reinforcement or to increase the amount thereof. By adding inexpensive gypsum recovered from the waste gypsum boards as an inorganic filler to the vinyl chloride resin, therefore, large amounts of the recovered gypsum can be reused.

Here, the gypsum recovered from the waste gypsum boards is a dihydrate gypsum ($CaSO_4.2H_2O$) and contains hydrated water. Therefore, a proposal has been made to use the dihydrate gypsum as a foaming agent for producing a foamed formed article of the vinyl chloride resin (see patent document 1). Namely, the dihydrate gypsum develops dehydration when the vinyl chloride resin is being formed enabling the water content to be utilized for the foaming.

There has, further, been proposed an example of blending the vinyl chloride resin with a hemihydrate gypsum as a filler. In this case, too, the obtained formed article is a foamed article (see patent document 2).

There has, further, been proposed a production of a nonfoamed formed article by using a mixture obtained by mixing calcium sulfate as a filler to the vinyl chloride resin (see patent document 3).

However, said calcium sulfate ($CaSO_4$) to be added to the vinyl chloride resin is an anhydrous gypsum which is not the hydrated water-containing gypsum (hereinafter often referred to simply as hydrated gypsum) such as the dihydrate gypsum or the hemihydrate gypsum ($CaSO_4.0.5H_2O$). As proposed in the above patent document 1, the hydrated gypsum causes foaming or defective forming due to the formation of water in the step of forming, resulting in defective appearance of the obtained formed articles. In producing the nonfoamed formed article of the vinyl chloride resin, therefore, said calcium sulfate that is added to the vinyl chloride resin is an anhydrous gypsum. When the hydrated gypsum is to be used, therefore, the hydrated gypsum must be converted into the anhydrous gypsum by the dehydration treatment prior to being added to the vinyl chloride resin.

The anhydrous gypsum includes those of the type I, type II and type III. The anhydrous gypsum of the type III having the lowest transition temperature has hygroscopic property, reacts with water in the open air and is easily converted into the hemihydrate gypsum. Therefore, the dihydrate gypsum is once converted into the anhydrous gypsum (non-hygroscopic gypsum) of the type II or the type I and is, thereafter, added to the vinyl chloride resin. Here, however, the dihydrate gypsum can be converted into the anhydrous gypsum of the type II requiring the heating at not lower than 400° C. and can be converted into the anhydrous gypsum of the type I requiring the heating at a further elevated temperature. In either case, therefore, a tremendous energy cost is necessary.

It is not allowed, as a matter of course, to convert the dihydrate gypsum into the non-hygroscopic anhydrous gypsum (type II or type I) in the presence of the vinyl chloride resin. The heating temperature for the conversion is 400° C. at the lowest, which is far beyond the temperature (about 210° C.) at which the vinyl chloride resin starts thermally decomposing.

Though the recovered gypsum is inexpensive as described above, the recovered gypsum which is the dihydrate gypsum could be added as the inorganic filler to the vinyl chloride resin only when the foamed article was to be formed. When the nonfoamed article of vinyl chloride resin was to be formed, however, a tremendous energy cost was necessary. In practice, therefore, the recovered gypsum has not been almost utilized.

PATENT DOCUMENTS

Patent document 1: JP-50-95366A
Patent document 2: JP-7-118436A
Patent document 3: JP-2010-533761T

SUMMARY OF THE INVENTION

Problems that the Invention is to Solve

It is, therefore, an object of the present invention to provide a method of producing nonfoamed foamed article of a vinyl chloride resin free of defective appearance by directly blending the vinyl chloride resin with the hydrated gypsum (specifically dihydrate gypsum) without converting it into the anhydrous gypsum, without requiring wasteful energy cost, without causing foaming or defective forming stemming from the hydrated water and maintaining stability.

Another object of the invention is to enhance the ratio of recycling the gypsum inexpensively recovered from the waste gypsum boards and the like through the use of the hydrated gypsum as the formed article of vinyl chloride resin, contributing to solving the problems of increasing amounts of the waste gypsum boards, dwindling final disposal sites in Japan and burden to the environment.

Means for Solving the Problems

According to the present invention, there is provided a method of producing a nonfoamed formed article of a vinyl chloride resin including following steps of:

mixing a hydrated water-containing gypsum powder and a vinyl chloride resin powder together;

heating the obtained mixture at a temperature being not lower than 180° C. and being lower than a temperature at which said vinyl chloride resin starts decomposing thereby to remove the hydrated water of said gypsum; and forming the mixture.

In the method of production of the invention, there can be preferably employed such means that:

(1) The hydrated water of the gypsum is removed in a mixer used for mixing the gypsum powder and the vinyl chloride resin powder together and/or in a vent-type forming machine used for forming the mixture;

(2) The hydrated water is removed from the gypsum powder by heating at a first step where the mixture is heated at a temperature of not lower than 125° C. in the mixer and by heating at a second step where the mixture is heated at a temperature of not lower than 180° C. in a cylinder portion in the vent-type forming machine;

(3) The gypsum powder is used in an amount of 1 to 70 parts by mass per 100 parts by mass of the vinyl chloride resin powder;

(4) Together with the gypsum powder, a plasticizer is mixed into the vinyl chloride resin powder in an amount of 1 to 140 parts by mass per 100 parts by mass of the vinyl chloride resin powder;

(5) Part of the plasticizer is mixed to the gypsum powder and the vinyl chloride resin powder while being heated, the obtained mixture thereof is once cooled and, thereafter, the rest of the plasticizer is mixed thereto while being heated; and (6) The gypsum is the recovered gypsum.

Here, the recovered gypsum has a concept in which it is not limited to the gypsum recovered by separating the papers from the discarded gypsum boards (waste gypsum boards) but includes gypsum used for various applications or was discarded without being used as well as the gypsum recovered as by-produced gypsum by desulfurizing the sulfur oxides formed by burning petroleum or coal (formed chiefly in thermal power plants).

Effects of the Invention

In producing the nonfoamed formed article by forming the vinyl chloride resin according to the present invention, the vinyl chloride resin powder can be directly mixed to conduct the forming without the need of converting the gypsum (hydrated gypsum) powder containing hydrated water into the anhydrous gypsum by the dehydration treatment, effectively avoiding inconvenience such as foaming or defective forming stemming from the hydrated water at the time of forming, and making it possible to produce the nonfoamed formed article of the vinyl chloride resin free of defective appearance maintaining stability.

Namely, in the invention, the hydrated gypsum powder is directly mixed to the vinyl chloride resin powder. Here, however, prior to forming, the hydrated water is removed by the dehydration by heating in the presence of the vinyl chloride resin at a temperature which is not lower than 180° C. and is lower than the decomposition temperature of the vinyl chloride resin. The temperature at which the vinyl chloride resin starts decomposing can be measured by the thermogravimetric analysis (TGA) and is about 210° C. Therefore, the hydrated gypsum converts into no more than the anhydrous gypsum of the type III making it possible not only to greatly decrease the cost of heat energy as compared to when the hydrated gypsum is converted into the gypsum of the type II or the type I that requires the heating at not lower than 400° C. but also to dehydrate the hydrated gypsum (removal of hydrated water) in the step of mixing the gypsum into the vinyl chloride resin and, therefore, making it possible to further decrease the cost of heat energy.

In the invention as described above, the anhydrous gypsum of the type III is formed from the hydrated gypsum. The anhydrous gypsum of the type III is hygroscopic and has a nature of being easily converted into the hemihydrate gypsum upon absorbing water. Besides, despite the mixture containing the anhydrous gypsum of the type III is thrown into the forming machine to form the molten kneaded product by extrusion, inconvenience such as foaming or defecting forming due to water content is effectively prevented. The reason is probably because the anhydrous gypsum of the type III formed from the hydrated gypsum is protected by the vinyl chloride resin having highly water-repelling property, is effectively suppressed from coming in contact with the external air, and is effectively prevented from absorbing water.

According to the present invention, the hydrated gypsum can be used as a filler in considerably large amounts for producing the nonfoamed formed articles of the vinyl chloride resin. Therefore, the gypsum recovered from the waste gypsum boards wasted annularly in large quantities can be recycled and consumed. Further, the gypsum by-produced by desulfurizing the exhaust gases from the thermal power plants can similarly be recovered and consumed in large amounts. Accordingly, the present invention offers a great effect in economy and is very useful from the standpoint of saving resources and maintaining environment, either.

MODE FOR CARRYING OUT THE INVENTION

To produce the nonfoamed formed article of the vinyl chloride resin according to the invention, the hydrated gypsum powder is mixed into the vinyl chloride resin powder prior to forming. The mixing is conducted in a mixer, the obtained mixture is thrown into a forming machine where it is melted and kneaded in the cylinder portion of the forming machine, and is formed being extruded or injected from the forming machine. The hydrated water is removed from the hydrated gypsum in the process of from mixing up to forming, whereby foaming or defective forming due to water is avoided, and the nonfoamed formed article free of defective appearance is obtained.

(Gypsum powder)

In the present invention, there is no specific limitation on the grain size of the gypsum powder added as a filler to the vinyl chloride resin provided the gypsum powder can be homogeneously mixed to the vinyl chloride resin powder. Usually, however, it is desired that the gypsum powder has a grain size of not larger than 10 mm and, specifically, 1 to 500 μm. Specifically, when it is attempted to produce the nonfoamed formed article of a hard vinyl chloride resin blended with no plasticizer, it is desired to use a fine powder with its grain size being so adjusted that an average gain size ($D_{50}$) is 1 to 10 μm when the cumulative volume thereof is 50% and an average grain size ($D_{50}$) is 2 to 20 μm when the cumulative volume thereof is 90% from the standpoint of dispersion in the resin.

There is no specific limitation on the gypsum that is used provided it contains hydrated water, and the gypsum may be hemihydrate gypsum, dihydrate gypsum or a mixture thereof, or may be natural gypsum or fibrous hemihydrate gypsum.

Usually, however, use is made of gypsum recovered from the materials wasted on an industrial scale. Namely, use of the recovered gypsum enables the rate of recycling the gypsum to be enhanced without requiring undesired cost.

The gypsum to be used in the invention may be recovered in any manner provided it contains hydrated water. From an industrial point of view, however, it is desired to use the gypsum that occurs in large amounts. For instance, the gypsum occurs in large amounts when it is recovered from the waste gypsum boards, which is most suited for use in the present invention. The gypsum recovered as by-produced gypsum from the exhaust gas of the thermal generation plants, too, can be favorably used. The recovered gypsum is put to use with its grain size being suitably adjusted as described above through milling and sieving.

Here, the waste gypsum board has a structure in which a board paper is adhered onto the surfaces of a core material of dihydrate gypsum. In many cases, the waste gypsum boards occur in the works of remolding the rooms and pulling down the buildings. The waste gypsum boards are recovered in a variety of sizes.

To use the waste gypsum boards as a gypsum source, therefore, the waste gypsum boards must be milled into a suitable size to recover the gypsum having the above-mentioned grain size, and the board paper must be removed from the waste gypsum boards.

The waste gypsum boards that occur from the gypsum boards used as building materials often contain metal pieces such as screws and the like attached thereto. Such metal pieces are removed by using a magnetic separator prior to the milling. This is to prevent the apparatus used for the milling from being damaged.

The waste gypsum boards are, usually, milled in a dry state. This is because if milled in a wet state, extra heat energy is required for removing the water.

The milling is conducted being divided into, for example, a pre-milling by which the waste gypsum boards are milled into a suitable size for easy handing and a selective milling by which the board paper is removed, both in the dry state.

The pre-milling is conducted by using an apparatus which mills the core materials (cured body of gypsum) as well as the board papers adhered thereto into suitable sizes, i.e., by using, for example, a high-revolving-speed shock milling machine, a screw shearing milling machine or the like machine. Through the pre-milling, the waste gypsum boards are milled into milled masses comprising gypsum masses (cured body of gypsum) of grain sizes of about 15 to 100 mm and paper pieces (board paper) of sizes of about $5 \times 10^{-4}$ to $0.05 \, m^2$ adhered thereto.

The selective milling is conducted for the milled masses to selectively mill the gypsum masses without, however, milling paper pieces (board paper); i.e., the selective milling is conducted by using a compression type milling apparatus which little mills the paper pieces, such as hammer mill or roll mill. Thus, the gypsum masses turn into a granular material having an average grain size of not larger than 20 mm and preferably, not larger than 10 mm, the paper pieces (board paper) without being almost milled but retaining their sizes. Therefore, the paper pieces (board paper) can be easily removed from the granular gypsum.

The paper pieces can be easily separated from the granular gypsum obtained by the selective milling by using, for example, a vibration type or a rotary type sieve. The sieve may have such a mesh size that permits the granular gypsum to pass through but does not permit the paper pieces (board paper) to pass through. Upon suitably selecting the mesh size, it is allowed to obtain the gypsum powder of which the maximum grain size is adjusted to be not larger than a predetermined value.

Depending upon its grain size, the granular gypsum thus obtained can be directly used as the gypsum powder (recovered gypsum powder) being mixed into the vinyl chloride resin. The granular gypsum, however, is, further, dry-milled to obtain a powder thereof of a grain size lying in the above-mentioned range and is then used being mixed into the vinyl chloride resin. Though there is no specific limitation on the finely milling means, there is, usually, used a high-revolving-speed shock milling machine or a jet mill.

(Vinyl Chloride Resin Powder)

A known vinyl chloride resin can be used in the present invention without any particular limitation. For instance, there can be used not only a homopolymer of the vinyl chloride monomer but also a copolymer copolymerized with other monomers so far as the properties of the vinyl chloride resin or the object of the invention are not impaired. As such copolymerizable monomers, there can be exemplified α-olefins such as ethylene and propylene, and vinyl esters such as vinyl acetate. These vinyl chloride resins can be used alone or in a combination of two or more kinds, as a matter of course.

The degree of polymerization of the vinyl chloride resin that is used is determined by taking the formability and properties into consideration so that a nonfoamed formed article having desired properties is obtained. Usually, the vinyl chloride resin having a degree of polymerization of 700 to 2500 is used, though it cannot be definitely determined.

Further, the vinyl chloride resin is used in the form of a powder having a grain size of, for example, 50 to 200 μm. Being used in the form of a powder, the vinyl chloride resin exhibits good affinity to the gypsum powder as compared to when it is used in the form of pellets, enabling the heating to be efficiently conducted for removing the hydrated water as will be described later.

The vinyl chloride resin powder can be obtained by the known suspension polymerization method.

(Other Blending Agents)

In the invention, the above-mentioned gypsum powder is mixed to the vinyl chloride resin. In addition to the gypsum powder, however, there can be added any other known blending agents, as required.

The other blending agents can be represented by plasticizers that impart flexibility to the formed articles. That is, the vinyl chloride resin blended with no plasticizer or blended with the plasticizer but in small amounts (e.g., not more than 20 parts by mass per 100 parts by mass of the vinyl chloride resin) has been known as a hard vinyl chloride resin, and the vinyl chloride resin blended with the plasticizer in large amounts (e.g., not less than 20 parts by mass) has been known as a soft vinyl chloride resin.

As the plasticizer used in the present invention, though there is no specific limitation, there can be exemplified dibutyl phthalate (DBP), diheptyl phthalate (DHP), di-2-ethylhexyl phthalate (DOP) and diisononyl phthalate (DINP).

In adding the plasticizer, there is no specific limitation on the amount of addition thereof. Usually, however, the plasticizer is added in an amount of about 1 to about 140 parts by mass per 100 parts by mass of the vinyl chloride resin powder. If the amount of addition is too small, flexibility is not sufficiently imparted. If the amount of addition is too large, on the other hand, a suitable degree of viscosity is not maintained at the time of forming. As a result, draw-down occurs making the forming difficult.

If the plasticizer is added in too large amounts, gelation takes place easily. Depending upon the amount of addition thereof, therefore, the plasticizer is mixed to the vinyl chloride resin and the gypsum powder being divided into two times. This will be described later.

Blending agents other than the plasticizer can also be optionally used. For instance, there can be added a filler other than the gypsum powder, as well as heat stabilizer, lubricant, reinforcing agent, antioxidant, pigment and the like.

Specifically, the heat stabilizer is a blending agent widely used in the field of vinyl chloride resins since it prevents the vinyl chloride resins from being deteriorated by heating at the time of forming. As the heat stabilizers, there have been known organotin stabilizers such as organotin mercapto and organotin maleate; metal soap stabilizers such as calcium stearate and zinc stearate; and nonmetallic stabilizers such as aminouracil and derivatives thereof, and aminocrotonic acid ester. They can be used alone or in a combination of two or more kinds.

(Mixing)

The above-mentioned gypsum powder containing hydrated water, vinyl chloride resin powder and other blending agents such as plasticizer and the like added as required, are mixed together by using a known mixer such as a mixer of the open type like Henschel's mixer in a manner of not destroying the vinyl chloride resin particles or, concretely, under such a temperature condition in dry state that no gel is formed. If gelation occurs in this step, unnecessarily large load is exerted on the mixer and, besides, it becomes difficult to homogeneously disperse the gypsum powder and other blending agents in the vinyl chloride resin. Depending upon the cases, further, masses of gypsum powder are formed causing the forming to become defective.

Here, if the gypsum powder is added in too large amounts, the finally obtained nonfoamed foamed article not only exhibits decreased mechanical properties but also makes it difficult to remove the hydrated water contained in the gypsum. Therefore, addition in too large amounts shall be avoided. The upper limit in the amount of adding the gypsum powder cannot be definitely specified since it varies depending upon the amount of use of other blending agents, upon the degree of polymerization of the vinyl chloride resin that is used, and upon the amount of the hydrated water contained in the gypsum. Usually, however, when the gypsum recovered from the waste gypsum boards is the dihydrate gypsum, the amount of addition of the gypsum is not more than 70 parts by mass and, specifically, not more than 60 parts by mass per 100 parts by mass of the vinyl chloride resin powder. Further, addition of the gypsum powder in too small amounts is not desirable from the standpoint of recycling the gypsum recovered from the waste gypsum boards that occur in large amounts. From the standpoint of improving the ratio of recycling, therefore, it is, usually, desired to use the gypsum powder in amounts of not less than 1 part by mass and, specifically, not less than 5 parts by mass per 100 parts by mass of the vinyl chloride resin powder.

The other blending agents to be optionally used may be added in amounts by which they do not impair basic properties of the vinyl chloride resin and do not impair basic properties of the blending agents, either. The plasticizer, for example, is added in amounts as described above.

In the mixer, the hydrated water in the gypsum is at least partly removed as will be described later by heating the gypsum to such a temperature that does not cause gelation. When the plasticizer is added, however, the vinyl chloride resin particles tend to be gelated (particles are collapsed) with an increase in the amount the plasticizer. When the plasticizer is to be added in such an amount that causes gelation, therefore, the plasticizer that is added is only partly thrown into the mixer and is mixed. After the plasticizer has been absorbed by the vinyl chloride resin powder, the obtained mixture is thrown into a cool mixer and is cooled down to about room temperature. Thereafter, by using again the mixer such as Henschel's mixer, the above mixture and the rest of the plasticizer are mixed together.

In the above case, if the gelation is occurring in the mixer can be confirmed relying on an increase in the torque exerted on the mixer. It is, therefore, recommended to carry out experiments in a laboratory in advance to make sure the temperature of gelation depending on the amount of the plasticizer that is added, and decide if the plasticizer be thrown at one time or in a divided manner based on the data.

(Forming)

The mixture containing the vinyl chloride resin powder prepared as described above and the gypsum powder is thrown into the forming machine through a hopper, melt-kneaded by being heated by a heater provided in the cylinder portion of the forming machine, and is formed into a non-foamed formed article of a predetermined shape by being extruded or injected from the forming machine.

As the forming machine, there can be used a vent-type forming machine having a vent hole formed in the downstream of the cylinder portion for releasing water that is removed as will be described below, e.g., a vent-type extruder. The extruder may be a monoaxial extruder, a biaxial extruder or a multi-axial extruder having three or more screws, and any one of them can be used so far as it has at least one vent hole. When the extrusion forming is conducted, for example, there is obtained a nonfoamed formed article of a shape that complies with the shape of the dies attached to an adaptor at an end of the cylinder portion of the extruder and when the injection forming is conducted, there is obtained a nonfoamed formed article of a shape that complies with the forming mold connected to the nozzle at an end of the extruder. It is, further, allowable to melt-extrude the mixture from the extruder in a stranded form, and cut the strand by using a pelletizer to form pellets. The pellets will be subjected to a secondary forming to obtain a formed article having a final shape.

(Removal of Hydrated Water)

In the present invention, the hydrated water must be removed from the gypsum in the process of from the above-mentioned mixing up to forming. That is, if the mixture is extruded from the forming machine in a state where the hydrated water is bonded to the gypsum, then the formed article that is obtained becomes a foamed article containing bubbles therein; i.e., the formed article possesses deteriorated properties and exhibits defective appearance. Besides, the mixture thrown through the hopper becomes massive due to the water formed by the dehydration in the cylinder of the forming machine. Therefore, blocking occurs in the forming machine (specifically, in the end portion) and said forming becomes defective. To prevent the above inconvenience and to efficiently produce the formed articles free of foaming, therefore, the hydrated water is removed.

The hydrated water is removed by heating the hydrated gypsum in the mixture at a temperature lower than a temperature at which the vinyl chloride resin starts thermally decomposing. It will, therefore, be learned that according to the present invention, the hydrated gypsum (dihydrate gypsum or hemihydrate gypsum) is converted into the anhydrous gypsum of the type III upon the removal of hydrated water. Therefore, the hydrated water is removed by heating the hydrated gypsum in the mixture at not lower than 180° C. and, preferably, not lower than 185° C. under the condition in which the heating temperature is lower than the temperature at which the vinyl chloride resin starts decomposing. If heated at lower than the above temperature, the hydrated water partly remains at the time of forming and it becomes difficult to prevent the foaming. If the amount of the hydrated water that remains is small to a certain degree, the presence of water can often be almost neglected in the step of forming pellets. When the pellets are subjected to the secondary forming, however, foaming due to water turns out to be defective appearance.

In the invention, further, the anhydrous gypsum formed upon removing the hydrated water is a hygroscopic anhydrous gypsum of the type III which is covered with the vinyl chloride resin having a high hydrophobic property effectively suppressing, accordingly, such an inconvenience that the formed anhydrous gypsum of the type III returns back to the hydrated gypsum upon absorbing water.

In this invention, the heating for removing the hydrated water can be conducted in the mixer for mixing the components or in the cylinder portion of the forming machine which melt-kneads the mixture. Basically, however, the hydrated water is preferably removed by heating in at least the mixer and, therefore, it is better to avoid the removal of hydrated water by heating in the forming machine only. In theory, the hydrated water can be removed by heating conducted in a manner of satisfying the above-mentioned temperature range. In conducting the heating in the forming machine, however, the mixture fed into the cylinder is extruded from the forming machine while being heated; i.e., the heating time cannot be sufficiently maintained for completely removing the hydrated water. When the heating is conducted in the mixer, on the other hand, the time can be sufficiently maintained and can also be easily adjusted. When the hydrated water is to be removed by heating in the cylinder portion of the forming machine, therefore, it is desired that the hydrated water has been partly removed by heating in the mixer in advance.

The mixer such as the Henschel's mixer is of the open type permitting water removed by heating to be quickly released into the open air. Further, the mixture can be heated in the mixer by using a heater incorporated in the mixer or by utilizing the heat of friction among the particles during the mixing.

Further, the water removed by heating in the forming machine is released through the vent hole formed in the forming machine.

When the hydrated water is to be removed in the mixer such as the Henschel's mixer, attention should be given to that heating is conducted at such a temperature that does not cause the vinyl chloride resin powder to be gelated. As described already, if gelation takes place in this step, various inconveniences occur due to a sharp increase in the torque often bringing the operation of the mixer into a halt or making it difficult to discharge the mixture from the mixer.

When no plasticizer is added, the gelation temperature becomes nearly the melting point of the vinyl chloride resin. Therefore, the hydrated water may be removed by conducting the heating in the above-mentioned range (not lower than 180° C. and, specifically, not lower than 185° C.) but at a temperature lower than the above melting point. When the plasticizer is added, the gelation tends to occur in proportion to the amount the plasticizer is added. Therefore, the hydrated water must be removed at such a temperature that does not cause gelation.

The gelation temperature decreases with an increase in the amount of addition of the plasticizer. In this case, therefore, the plasticizer is thrown into the mixer in a divided manner, the mixture is thrown into the cool mixer for every throw-in of the plasticizer and is cooled. After cooled, the mixture is thrown again together with the rest of the plasticizer into the mixer that is to be heated again, and is mixed. In any step, the mixing is conducted at a temperature that does not cause the gelation.

In the invention, further, when the mixture contains water in large amounts, it is recommended to partly remove the hydrated water by heating in the mixer. For example, when the content of water is not less than 2 parts by mass and, preferably, not less than 3 parts by mass per 100 parts by mass of the vinyl chloride resin (not less than 10 parts by mass and, preferably, not less than 15 parts by mass as the amount of the dihydrate gypsum), the hydrated water is desirably removed by heating in the first step in the mixer and by heating in the second step in the forming machine.

That is, if the amount of the hydrated water is large, a correspondingly extended heating time is necessary for completely removing the hydrated water. In the mixer, in particular, a further extended heating time is necessary due to the restriction of not causing the gelation. Though the heating cannot be conducted for an extended period of time in the forming machine, there is no restriction of gelation and, therefore, the hydrated water can be removed at higher than the melting point of the vinyl chloride resin. Accordingly, by utilizing the heating in the mixer and the heating in the forming machine in combination, the hydrated water can be completely removed efficiently and in a short period of time.

When the hydrated water is to be removed by heating in two steps as described above, the heating in the first step (heating in the mixer) is conducted at a temperature of at least not lower than 125° C. to heat the mixture (hydrated gypsum) under the condition of not causing the gelation. After the heating is conducted in this temperature range for a suitable period of time, the rest of the hydrated water is removed by the subsequent heating in the second step (heating in the forming machine) to thereby efficiently remove the water. The heating in the second step is conducted to satisfy the condition of the above-mentioned range (not lower than 180° C. and, specifically, not lower than 185° C.), as a matter of course.

When the hydrated water is to be removed by heating in two steps, further, the dehydration can be efficiently conducted by adjusting the heating time in the first step (heating in the mixer). That is, heating in the second step is conducted in the forming machine under the forming condition, and the heating temperature and the heating time (corresponds to the extrusion rate) are allowed to be varied in only very narrow ranges. When the heating is conducted in the mixer, on the other hand, the heating temperature and the heating time can be varied over a very wide range but being restricted that the gelation must be avoided.

Said heating in the second step is conducted in the cylinder portion of the forming machine. Here, the heaters are separately provided so that the temperatures can be independently set on the upstream side of the cylinder (mixture thrown-in side) and on the downstream side of the cylinder (melt discharge side). Specifically, since the melt is formed while being discharged on the downstream side, the temperature is set to be high on the downstream side. Besides, vent holes are formed in one place or in a plurality of places on the downstream side. Accordingly, the dehydration is conducted by at least being heated in the above-mentioned range on the downstream side, and water generated by the dehydration is quickly discharged through the vent holes reliably preventing the foaming that is caused by the water that remains in the formed article that is obtained.

In this case, further, it is desired to maintain the time long enough for completely removing the remaining hydrated water by setting the rotational speed of the screw of the forming machine to be relatively low to lower the rate of feeding and to lengthen the residence time of the mixture in the cylinder.

When the polyvinyl chloride resin formed article is to be produced without using hydrated gypsum, the temperature for mixing the vinyl chloride resin powder and the blending agent, i.e., the temperature corresponding to heating in the first step is, usually, 90 to 120° C. when the soft vinyl chloride resin is used and is 80 to 120° C. when the hard vinyl chloride resin is used. The temperature for forming the vinyl chloride resin, i.e., the temperature corresponding to the heating in the second step of the present invention, is determined depending upon the gelation temperature of the resin, and is, usually, 130 to 170° C. when the soft vinyl chloride resin is used and is 160 to 200° C. when the hard vinyl chloride resin is used.

According to the present invention as described above, despite the gypsum containing hydrated water is added as a filler to the vinyl chloride resin, it is allowed to effectively prevent the foaming caused by water and to obtain a nonfoamed formed article. Therefore, the present invention is industrially very useful from the standpoint of directly utilizing, as a filler, the gypsum recovered from the waste gypsum boards that occur in very large amounts and greatly improving the ratio of recycling the recovered gypsum.

Here, the nonfoamed formed article of the present invention incorporates the hygroscopic anhydrous gypsum of the type III. Therefore, the anhydrous gypsum of the type III exposed on the surface may often be re-converted back to the hydrated gypsum. However, the re-conversion takes place after forming and in only very small amounts affecting, quite negligibly, the properties of the formed articles.

In recent years, further, generation of hydrogen sulfide is becoming a problem when the waste gypsum boards wasted from rebuilding the houses are discarded in a waste disposal site. Namely, it is considered that the sulfate reducing bacteria living in underground water and soils in the waste disposal site produce hydrogen sulfate upon reacting with starches which are the adhesives for sticking the wallpapers to the gypsum boards, reacting with organic matters brought to the disposal site together with the wastes and reacting with the gypsum.

With the formed article of the present invention, however, since the gypsum is covered with the vinyl chloride resin, hydrogen sulfide is not almost produced even when it is disposed of, offering an advantage of not adversely affecting the environment.

EXAMPLES

The present invention will now be described in further detail with reference to Examples to which only, however, the invention is in no way limited.

Example 1

By using the Plasturbo Series manufactured by Hosoda Kikaku Co. as a crusher, the waste gypsum boards were crushed and the board paper was separated from the gypsum masses to obtain a gypsum (dihydrate gypsum) powder of not larger than 0.5 mm. Next, the gypsum powder was finely milled by using a jet mill (Nano-Grinding Mill manufactured by Sunrex Kogyo Co.) to obtain a recovered fine gypsum powder for use as a filler having $D_{50}$: 1 μm, $D_{90}$: 2 μm.

Next, a blend of:

100 parts by mass of a vinyl chloride resin powder (ZEST 800Y manufactured by Shin-Daiichi Enbi Co.) of a polymerization degree of 800;

10 parts by mass of the recovered fine gypsum powder;

6 parts by mass of calcium carbonate (Vigot 10 manufactured by Shiraishi Kogyo Co.);

8 parts by mass of a reinforcing agent;

4.5 parts by mass of a heat stabilizer; and 2.4 parts by mass of a lubricating agent, was thrown into the Henschel's mixer, and was mixed by being heated from room temperature until the temperature reached 165° C. to remove the hydrated water. After mixed, the mixture was thrown into a cool mixer and was cooled.

The mixture was thrown into a hopper and, by using a screw-type feeder, was thrown into a vent-type conical extruder (CMT 45 manufactured by Cincinnati Milacron Co.) and was, thereafter, extruded in a stranded manner while deaerating. Next, the strand was cooled with water and was cut by using a pelletizer. The blending conditions and the forming conditions were as shown in Table 1.

As a result, there were obtained unfoamed favorable pellets. By using the pellets, a test piece was prepared and was evaluated for its properties. The evaluated results of properties were as shown in Table 1. Here, the properties were evaluated or measured according to the methods described below.

(Evaluating and measuring properties)

1. Formability:

Evaluated by making sure if the starting materials were smoothly fed through the hopper, if foamed as viewed with the naked eye and if the strand was developing draw-down.

2. Foaming in the Sheet:

The pellets were thrown into a 20-mm no-vent type monoaxial extruder heated at 150° C. on the upstream of the cylinder, at 170° C. on the downstream of the cylinder and at 180° C. in the dies. A sheet formed by throwing the pellets was made sure if it was foaming with the naked eye.

3. Flexural Modulus of Elasticity:

Measured in compliance with the JIS K 7171.

4. Bending Strength:

Measured in compliance with the JIS K 7171.

5. Charply Impact Strength:

Measured in compliance with the JIS K 7111.

6. Vicat Softening Temperature:

Measured in compliance with the JIS K 7206.

Reference Example

A vinyl chloride resin formed article (pellets) formed in the same manner as in Example 1 but without blended with the recovered fine gypsum powder was evaluated for its properties. The evaluated results of properties were as shown in Table 1.

TABLE 1

|  | Ex. 1 | Ref. Example |
|---|---|---|
| PVC powder (mass parts) | 100 | 100 |
| PVC polymerization degree | 800 | 800 |
| Recovered fine gypsum powder (mass parts) | 10 | 0 |
| $CaCO_3$ (mass parts) | 6 | 6 |
| Reinforcing agent (mass parts) | 8 | 8 |
| Stabilizer (mass parts) | 4.5 | 4.5 |
| Lubricant (mass parts) | 2.4 | 2.4 |
| Temperature reached (° C.) | 165 | 165 |
| Screw rotational speed (rpm) | 35 | 35 |
| Cylinder upstream temp. (° C.) | 160 | 160 |

TABLE 1-continued

|  | Ex. 1 | Ref. Example |
|---|---|---|
| Cylinder downstream tem. (° C.) | 180 | 180 |
| Adaptor (° C.) | 185 | 185 |
| Dies (° C.) | 190 | 190 |
| Formability | good | — |
| Sheet foamed | no | — |
| Specific gravity (—) | 1.42 | 1.38 |
| Flexural modulus of elasticity (MPa) | 3177 | 2850 |
| Bending strength (MPa) | 71.8 | 72.6 |
| Charpy impact strength (kJ/m$^2$) |  |  |
| Vicat softening temperature 10N (° C.) | 87.6 | 87.9 |
| Vicat softening temperature 50N (° C.) | 80.5 | 80.4 |

2nd Temp. Reached (° C.):
Temperature (° C.) that was reached while being mixed in the Henschel's mixer.

Example 2

100 Parts by mass of a vinyl chloride resin powder (ZEST 1000Z manufactured by Shin-Daiichi Enbi Co.) of a polymerization degree of 1000;

50 parts by mass of the recovered gypsum powder of not larger than 0.5 mm according to Example 1;

40 parts by mass of a plasticizer (DINP);

6 parts by mass of a heat stabilizer; and 1.5 parts by mass of a lubricant;

were thrown into the Henschel's mixer, and were mixed while being heated from room temperature until the temperature reached 165° C. to remove the hydrated water. After mixed, the mixture was thrown into the cool mixer and was cooled.

The mixture was thrown into the hopper and, by using the screw-type feeder, was thrown into the vent-type conical extruder and was, thereafter, extruded in a stranded manner while deaerating. Next, the strand was cooled with water and was cut by using the pelletizer. The blending conditions and the forming conditions were as shown in Table 2.

As a result, the strand maintained a suitable degree of viscosity and could be guided into the pelletizer. Upon dehydrating the recovered gypsum powder, further, the water vapor generated in the extruder was deaerated, and unfoamed pellets were obtained.

The obtained pellets were thrown into the 20-mm no-vent type monoaxial extruder heated at 150° C. on the upstream of the cylinder, at 170° C. on the downstream of the cylinder and at 180° C. in the dies to form a sheet. There was obtained an unfoamed favorable sheet.

Example 3

The operation was carried out in the same manner as in Example 2 but adding the recovered gypsum powder in an amount of 5 parts by mass, setting the temperature at 100° C. that was to be reached in conducting the mixing in the Henschel's mixer and directly throwing the obtained mixture into the vent-type conical extruder. The blending conditions and the forming conditions were as shown in Table 2.

As a result, the strand maintained a suitable degree of viscosity and could be guided into the pelletizer. Upon dehydrating the recovered gypsum powder, further, the water vapor generated in the extruder was deaerated, and unfoamed pellets were obtained.

The obtained pellets were thrown into the 20-mm no-vent type monoaxial extruder heated at 150° C. on the upstream of the cylinder, at 170° C. on the downstream of the cylinder and at 180° C. in the dies to form a sheet. There was obtained an unfoamed favorable sheet.

Example 4

The operation was carried out in the same manner as in Example 2 but using the plasticizer in an amount of 60 parts by mass, and throwing in the plasticizer being divided into two times of 40 parts by weight and 20 parts by weight. The blending conditions and the forming conditions were as shown in Table 2.

As a result, the strand maintained a suitable degree of viscosity and could be guided into the pelletizer. Upon dehydrating the recovered gypsum powder, further, the water vapor generated in the extruder was deaerated, and unfoamed pellets were obtained.

The obtained pellets were thrown into the 20-mm no-vent type monoaxial extruder heated at 150° C. on the upstream of the cylinder, at 170° C. on the downstream of the cylinder and at 180° C. in the dies to form a sheet. There was obtained an unfoamed favorable sheet.

Example 5

The operation was carried out in the same manner as in Example 2 but changing the vinyl chloride resin powder into the ZEST 2500Z of a polymerization degree of 2500 manufactured by Shin-Dai-ichi Vinyl Co. and adding the plasticizer in an amount of 75 parts by mass. The blending conditions and the forming conditions were as shown in Table 2.

As a result, the mixture in the Henschel's mixer could be thrown into the extruder, and the strand maintained a suitable degree of viscosity and could be guided into the pelletizer. Upon dehydrating the recovered gypsum powder, further, the water vapor generated in the extruder was deaerated, and unfoamed pellets were obtained.

The obtained pellets were thrown into the 20-mm no-vent type monoaxial extruder heated at 150° C. on the upstream of the cylinder, at 170° C. on the downstream of the cylinder and at 180° C. in the dies to form a sheet. There was obtained an unfoamed favorable sheet.

Example 6

In Example 5, the operation was carried out in the same manner as in Example 2 but using the plasticizer in an amount of 130 parts by mass, and throwing in the plasticizer being divided into two times of 75 parts by weight and 55 parts by weight. The blending conditions and the forming conditions were as shown in Table 2.

As a result, the strand maintained a suitable degree of viscosity and could be guided into the pelletizer. Upon dehydrating the recovered gypsum powder, further, the water vapor generated in the extruder was deaerated, and unfoamed pellets were obtained.

The obtained pellets were thrown into the 20-mm no-vent type monoaxial extruder heated at 150° C. on the upstream of the cylinder, at 170° C. on the downstream of the cylinder and at 180° C. in the dies to form a sheet. There was obtained an unfoamed favorable sheet.

Comparative Example 1

In Example 2, the operation was carried out in the same manner as in Example 2 but heating the vent-type conical extruder at 150° C. on the upstream of the cylinder and at 175°

C. on the downstream of the cylinder. The blending conditions and the forming conditions were as shown in Table 3.

As a result, the strand maintained a suitable degree of viscosity, could be guided into the pelletizer, and from which pellets free of foaming were obtained. The pellets were thrown into the 20-mm no-vent type monoaxial extruder heated at 150° C. on the upstream of the cylinder, at 170° C. on the downstream of the cylinder and at 180° C. in the dies to form a sheet. However, there was obtained a foamed sheet.

Comparative Example 2

The operation was carried out in the same manner as in Example 2 but setting the heating temperature at 100° C. that was to be reached in conducting the mixing in the Henschel's mixer. The blending conditions and the forming conditions were as shown in Table 3.

As a result, water vapor generated in large amounts in the extruder due to the dehydration of the recovered gypsum powder and flew back to the starting material throwing port, and the gypsum mixture to which water has adhered became massive choking the starting material throw port. Therefore, the starting material could not be fed as blended into the extruder. Further, the massive gypsum mixture entered into the extruder to clog the dies, and the strand could not be obtained.

Comparative Example 3

The operation was carried out in the same manner as in Example 4 but adding the plasticizer in an amount of 80 parts by mass. The blending conditions and the forming conditions were as shown in Table 3.

As a result, draw-down occurred, and the production could not be stably conducted.

Comparative Example 4

The operation was carried out in the same manner as in Example 6 but adding the plasticizer in an amount of 150 parts by mass. The blending conditions and the forming conditions were as shown in Table 3.

As a result, draw-down occurred, and the production could not be stably conducted.

TABLE 2

|  | Ex. 2 | Ex. 3 | Ex. 4 | Ex. 5 | Ex. 6 |
| --- | --- | --- | --- | --- | --- |
| PVC powder (mass pts.) | 100 | 100 | 100 | 100 | 100 |
| PVC polymerization deg. | 1000 | 1000 | 1000 | 2500 | 2500 |
| Recovered gypsum powder (mass pts.) | 50 | 5 | 50 | 50 | 50 |
| Plasticizer (mass pts.) | 40 | 40 | 60 | 75 | 130 |
| Stabilizer (mass pts.) | 6 | 6 | 6 | 6 | 6 |
| Lubricant (mass pts.) | 1.5 | 1.5 | 1.5 | 1.5 | 1.5 |
| Plasticizer, 1st time (mass pts.) | 40 | 40 | 40 | 75 | 75 |
| 1st Temp. (° C.) reached | 165 | 100 | 165 | 165 | 165 |
| Plasticizer, 2nd time (mass pts.) | — | — | 20 | — | 55 |
| 2nd Temp. (° C.) reached | — | — | 120 | — | 120 |
| Screw speed (rpm) | 35 | 35 | 35 | 35 | 35 |
| Cylinder upstream temp. (° C.) | 160 | 160 | 160 | 160 | 160 |
| Cylinder downstream temp. (° C.) | 180 | 180 | 180 | 180 | 180 |
| Adaptor (° C.) | 185 | 185 | 185 | 185 | 185 |
| Dies (° C.) | 190 | 190 | 190 | 190 | 190 |

TABLE 2-continued

|  | Ex. 2 | Ex. 3 | Ex. 4 | Ex. 5 | Ex. 6 |
| --- | --- | --- | --- | --- | --- |
| Formability | good | good | good | good | good |
| Sheet foamed | no | no | no | no | no |

1st Temp. Reached:
Temperature (° C.) reached in the Henschel's mixer when the plasticizer was thrown and mixed in the first time.
2nd Temp. Reached:
Temperature (° C.) reached in the Henschel's mixer when the plasticizer was thrown and mixed in the second time.

TABLE 3

|  | Comp. Ex. 1 | Comp. Ex. 2 | Comp. Ex. 3 | Comp. Ex. 4 |
| --- | --- | --- | --- | --- |
| PVC powder (mass pts.) | 100 | 100 | 100 | 100 |
| PVC polymerization deg. | 1000 | 1000 | 1000 | 2500 |
| Recovered gypsum powder (mass pts.) | 50 | 50 | 50 | 50 |
| Plasticizer (mass pts.) | 40 | 40 | 80 | 150 |
| Stabilizer (mass pts.) | 6 | 6 | 6 | 6 |
| Lubricant (mass pts.) | 1.5 | 1.5 | 1.5 | 1.5 |
| Plasticizer, 1st time (mass pts.) | 40 | 40 | 40 | 75 |
| 1st Temp. (° C.) reached | 165 | 100 | 165 | 165 |
| Plasticizer, 2nd time (mass pts.) | — | — | 40 | 75 |
| 2nd Temp. (° C.) reached | — | — | 120 | 120 |
| Screw speed (rpm) | 35 | 35 | 35 | 35 |
| Cylinder upstream temp. (° C.) | 150 | 160 | 160 | 160 |
| Cylinder downstream temp. (° C.) | 175 | 180 | 180 | 180 |
| Adaptor (° C.) | 180 | 185 | 185 | 185 |
| Dies (° C.) | 185 | 190 | 190 | 190 |
| Formability | good | poor (*1) | poor (*2) | poor (*2) |
| Sheet foamed | yes | — | — | — |

(*1): could not be kneaded
(*2): draw-down occurred (Evaluating the Generation of Hydrogen Sulfide)

Into two Duran bottles of a volume of 500 mL, there were separately introduced 50 g of a sheet of a thickness of 4 mm formed by using the pellets of Example 2 and 12.7 g of a recovered gypsum powder which corresponds to the amount of the recovered gypsum powder contained in 50 g of the above sheet. Thereafter, 200 mL of pure water and the sulfate reducing bacteria were introduced to each of the bottles.

Figure 1:
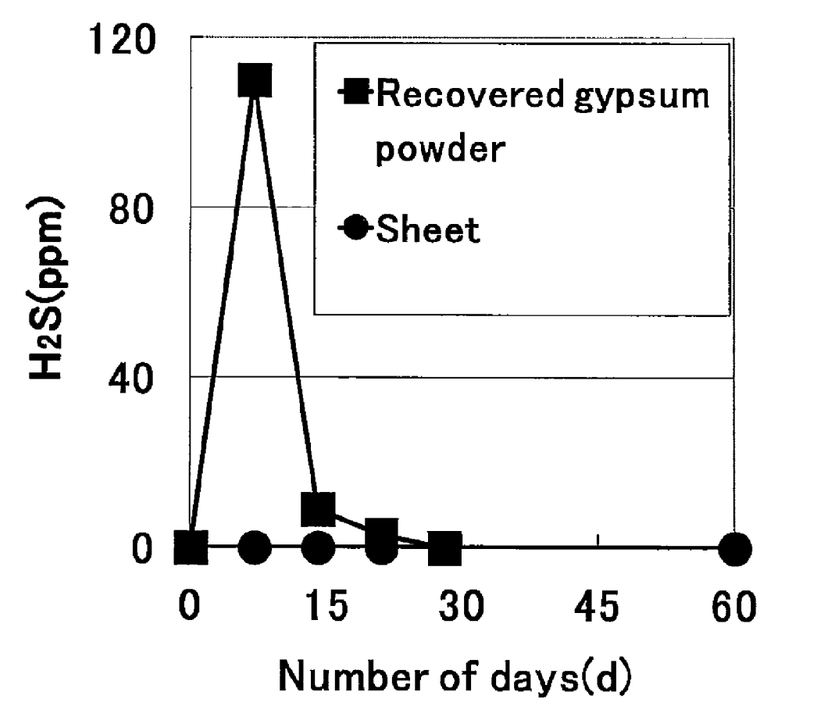
FIG. 1 is a diagram showing the results of a test for generating the hydrogen sulfide by using a sheet formed from the pellets prepared in Example 2.

Further, 0.1 g of a starch used for the adhesive for wallpaper was added to each of the bottles, and a highly pure nitrogen gas was blown into the aqueous solutions to purge the head space gas with nitrogen while deaerating oxygen dissolved in the aqueous solutions. After purged with the gas, the bottles were readily sealed with silicon plugs, left to stand still in a constant temperature bath maintained at 35° C. to promote the generation of hydrogen sulfide. Within one month from starting the evaluation, the gases in the Duran bottles were picked up every week. After one month has passed from the start of evaluation, the gases in the Duran bottles were picked up after one more month. About these gases picked up, the concentrations of hydrogen sulfide were measured by gas chromatography. The results were as shown in FIG. 1.

In the bottle containing the recovered gypsum alone, the hydrogen sulfide was detected at a concentration of 110 ppm after one week from the start of evaluation. In the bottle containing the vinyl chloride resin sheet blended with the recovered gypsum, the concentration of the hydrogen sulfide was lower than the detection limit of the gas chromatography (0.01 ppm) even after the passage of 2 months from the start of evaluation.

Thus, the vinyl chloride resin sheet blended with the recovered gypsum generated the hydrogen sulfide in very small amounts as compared to those formed by the recovered gypsum alone.

We claim:

1. A method of producing a nonfoamed formed article of a vinyl chloride resin including following steps of:
    mixing a hydrated water-containing gypsum powder and a vinyl chloride resin powder together;
    heating the obtained mixture at a temperature being not lower than 180° C. and being lower than a temperature at which said vinyl chloride resin starts decomposing thereby to remove the hydrated water of said gypsum; and
    forming the mixture.

2. The method of production according to claim 1, wherein the hydrated water of said gypsum is removed in a mixer used for mixing said gypsum powder and said vinyl chloride resin powder together and/or in a vent-type forming machine used for forming said mixture.

3. The method of production according to claim 2, wherein the hydrated water is removed from said gypsum powder by heating at a first step where said mixture is heated at a temperature of not lower than 125° C. in said mixer and by heating at a second step where said mixture is heated at a temperature of not lower than 180° C. in a cylinder portion in said vent-type forming machine.

4. The method of production according to claim 2, wherein said gypsum powder is used in an amount of 1 to 70 parts by mass per 100 parts by mass of the vinyl chloride resin powder.

5. The method of production according to claim 2, wherein, together with said gypsum powder, a plasticizer is mixed into said vinyl chloride resin powder in an amount of 1 to 140 parts by mass per 100 parts by mass of said vinyl chloride resin powder.

6. The method of production according to claim 5, wherein part of said plasticizer is mixed to said gypsum powder and said vinyl chloride resin powder while being heated, the obtained mixture thereof is once cooled and, thereafter, the rest of the plasticizer is mixed thereto while being heated.

7. The method of production according to claim 1 wherein said gypsum is recovered gypsum.

* * * * *